United States Patent [19]

Duncan et al.

[11] 4,348,372

[45] Sep. 7, 1982

[54] PROCESS FOR THE RECOVERY OF CALCIUM CHLORIDE FROM CALCIUM HYPOCHLORITE PROCESS EFFLUENTS

[75] Inventors: Budd L. Duncan, Athens; Ian L. Madden, Cleveland, both of Tenn.

[73] Assignee: Olin Corporation, New Haven, Conn.

[21] Appl. No.: 260,653

[22] Filed: May 4, 1981

[51] Int. Cl.$^3$ .............................................. C01F 11/24
[52] U.S. Cl. ...................................... 423/497; 23/304
[58] Field of Search ............................... 423/473–476, 423/497, 499, 50; 23/304

[56] References Cited

U.S. PATENT DOCUMENTS 1,922,697  8/1933  Heath ................................... 423/497
3,030,177  4/1962  Mohan, Jr. ........................... 423/474

FOREIGN PATENT DOCUMENTS 311866  2/1970  U.S.S.R. ............................... 423/497

OTHER PUBLICATIONS

Chemical Abstracts 73, 132608w (1970)—H. Yamashita et al.—Japan 70 28,287, Sep. 16, 1970.
Kirk-Othmer. Encyclopedia of Chemical Technology—3rd edition vol. 4, pp. 432–434—N.Y.—Wiley—1978.

Primary Examiner—Earl C. Thomas
Attorney, Agent, or Firm—James B. Haglind; Donald F. Clements

[57] ABSTRACT

Calcium chloride hydrates are recovered from calcium hypochlorite process effluents comprised of an aqueous solution of calcium chloride, calcium hypochlorite, and calcium chlorate in a process which comprises acidifying the effluent with a chlorine-containing compound selected from the group consisting of chlorine, hydrochloric acid and hydrogen chloride to form an acidic aqueous solution of calcium chloride having reduced concentrations of calcium hypochlorite. Water is evaporated from the acidic aqueous solution to produce a concentrated acidic aqueous solution containing at least 45 percent by weight of calcium chloride. The concentrated acidic aqueous solution of calcium chloride is fed to a crystallizer to form crystals of a calcium chloride hydrate. The calcium chloride hydrate crystals are separated from a mother liquor and recovered.

The process is used to produce calcium chloride hexahydrate, calcium chloride tetrahydrate or calcium chloride dihydrate.

8 Claims, No Drawings

PROCESS FOR THE RECOVERY OF CALCIUM CHLORIDE FROM CALCIUM HYPOCHLORITE PROCESS EFFLUENTS

This invention relates to the manufacture of calcium hypochlorite products. More specifically, the invention relates to the recovery of calcium salts from effluents produced in the manufacture of calcium hypochlorite products.

Calcium hypochlorite is a well known commercial product employed as a disinfectant and sanitizer in, for example, water bodies such as swimming pools. It can be produced in various forms including neutral calcium hypochlorite $Ca(OCl)_2$, hemibasic calcium hypochlorite $Ca(OCl)_2 \cdot \frac{1}{2}Ca(OH)_2$, and dibasic calcium hypochlorite $Ca(OCl)_2 \cdot 2Ca(OH)_2$. Processes for producing each of these forms are described, for example, in *Kirk-Othmer's Encyclopedia of Chemical Technology*, 3rd Ed., Vol. 5, 599–602, John Wiley & Sons, 1979. In producing hemibasic hypochlorite and dibasic hypochlorite, a slurry of lime is chlorinated to produce hypochlorite crystals which are separated from a filtrate. The filtrate, containing substantial amounts of calcium chloride, moderate amounts of calcium hypochlorite as well as calcium chlorate, may be subsequently treated with additional lime to recover a portion of the dissolved hypochlorite remaining in the filtrate. It has been the practice to discard the remaining portion of the filtrate as described, for example, in U.S. Pat. No. 2,374,835, issued May 1, 1945, to H. L. Robson or U.S. Pat. No. 3,030,177, issued Apr. 17, 1962 to J. C. Mohan, Jr. In addition to the economic loss resulting from the discarding of the filtrate containing calcium salts, this procedure is now prohibited as it poses an environmental hazard, if, for example, these solutions are added to public waterways such as rivers and streams.

Thus, there is a need for a process for recovering calcium chloride from effluents produced during the production of hemibasic and dibasic hypochlorite which is economical and which poses no pollution problem.

An object of the present invention is to provide a process for the recovery of calcium chloride from aqueous effluents obtained in the production of calcium hypochlorite.

Another object of the present invention is to provide a process in which the disposal of waste solutions poses no pollution problem.

These and other objects of the present invention are accomplished in a process for the recovery of calcium chloride hydrates from calcium hypochlorite process effluents which comprises:

(a) acidifying an effluent comprised of an aqueous solution of calcium chloride, calcium hypochlorite, and calcium chlorate with a chlorine-containing compound selected from the group consisting of chlorine, hydrochloric acid, and hydrogen chloride to form an acidic aqueous solution of calcium chloride having reduced concentrations of calcium hypochlorite;

(b) evaporating water from said acidic aqueous solution to produce a concentrated acidic aqueous solution of calcium chloride containing at least 45 percent by weight of calcium chloride;

(c) feeding said concentrated acidic aqueous solution of calcium chloride to a crystallizer to form crystals of a calcium chloride hydrate;

(d) separating said crystals of said calcium chloride hydrate from a waste liquor; and (e) recovering said crystals of said calcium chloride hydrate.

The effluent from the hemibasic hypochlorite or dibasic hypochlorite process is an alkaline aqueous solution comprised of calcium chloride with varying amounts of calcium hypochlorite and small amounts of calcium chlorate and having a pH of about 8 or higher. The effluent may also contain traces of lime. The concentration of calcium chloride in the effluent is normally in the range of from about 10 to about 25 percent by weight although effluents having higher or lower concentrations of $CaCl_2$ can be employed in the process of the present invention. Calcium hypochlorite concentrations in the effluent may range from about 1 to about 12 percent, but are preferably in the range of from about 1 to about 5 percent by weight. Calcium chlorate is present in the effluent in amounts up to about 1 percent by weight.

To reduce the calcium hypochlorite concentration, the effluent is acidified by the addition of a chlorine-containing compound selected from the group consisting of chlorine, hydrochloric acid, and hydrogen chloride, with hydrochloric acid being preferred for convenience of application. Sufficient amounts of the chlorine-containing compound are added to reduce the pH of the effluent to below about 5, perferably in the range of from about 2 to about 5. Acidification of the effluent reduces the concentration of $Ca(OCl)_2$ present to less than about 1.0 percent and preferably less than about 0.25 percent by weight. Any lime present in the effluent is also removed during acidification.

During acidification, chlorine gas is formed. Any $Cl_2$ released from the effluent is preferably recovered and recycled to be used as a portion of the chlorine-containing compound required for acidification, for example, either directly or after its conversion to hydrochloric acid.

The acidified aqueous solution of calcium chloride is concentrated by evaporating water to produce a concentrated calcium chloride solution containing at least 45 and preferably from about 45 to about 60 percent by weight of calcium chloride.

The concentration method used is selected in conjunction with the crystalline calcium chloride hydrate desired as a product. For example, where calcium chloride hexahydrate crystals are to be produced, a vacuum distillation unit may be used to evaporate water from the acidified aqueous solution. The evaporation is carried out at temperatures in the range of from about 40° to about 60° C. under a vacuum maintained at from about 25 to about 60 millimeters of Hg. The concentrated acidified solution of calcium chloride obtained is fed to a cooling crystallizer which is maintained at temperatures in the range of from about 0° to about 30° C. to produce crystals of calcium chloride hexahydrate. The crystals are separated from a waste liquor, washed with a saturated solution of calcium chloride and dried with air under conditions which prevent the crystals from substantially picking up or losing water.

Where calcium chloride tetrahydrate, calcium chloride dihydrate, or mixtures thereof are the desired products, the concentration of the acidified solution can be carried out in an evaporative crystallizer which is operated at temperatures above about 30° C. at vacuums of from about 20 to about 30 millimeters of Hg. For example, at temperatures in the range of about 30° to about 45° C., the acidified solution when concentrated to between about 50 and about 60 weight percent of $CaCl_2$ produces primarily crystals of calcium chloride tetrahydrate. At higher temperatures for example, from about 60° to about 80° C., and $CaCl_2$ concentrations of about 60 percent by weight, calcium chloride dihydrate is the primary crystalline product.

In another embodiment, calcium chloride dihydrate or anhydrous calcium chloride is produced by dehydration of the hexahydrate. For example, calcium chloride hexahydrate crystals are fed to a dryer such as a rotary dryer which is operated under controlled temperature and humidity conditions to remove sufficient water of hydration to produce the desired compound.

When produced in an evaporative or cooling crystallizer, the calcium chloride hydrate crystals are separated from a waste liquor. The crystals are washed with a saturated solution of $CaCl_2$ and air dried or oven dried under conditions which maintain the drying gases at temperature and humidity conditions which prevent substantial changes in the amounts of water of hydration.

The waste liquor recovered from the crystallizer contains calcium chloride in amounts of from about 40 to about 45 percent by weight and small amounts of the more soluble calcium chlorate. Additional water from this waste solution can be evaporated to increase the $CaCl_2$ concentration to from about 50 to about 60 percent and the solids recovered and sold as an impure $CaCl_2$ source. The waste solution can be evaporated to dryness and the remaining solids placed in landfill areas.

The novel process of the present invention can be operated continuously to recover commercially valuable calcium compounds from effluents produced in the production of calcium hypochlorite. Calcium chloride hexahydrate is an excellent heat storage medium which is used commercially in solar energy applications. The calcium chloride dihydrate and tetrahydrate produced can be employed as drying agents. The calcium chloride hydrates can be dried to produce anhydrous calcium chloride, a commercial drying agent. The novel process further provides for the disposal of waste solutions in a manner which poses no pollution problems.

The process of the present invention is further illustrated by the following examples without any intention of being limited thereby.

EXAMPLE 1

A filtrate from a calcium hypochlorite cake filter (100 parts) containing 22 percent by weight of calcium chloride, 2.47 percent by weight of calcium hypochlorite and 0.7 percent by weight of calcium chlorate and 0.4 percent by weight of lime was acidified by the addition of 4 parts by weight of 12 m HCl. After acidification, the pH of the filtrate was 4.8 and it contained 24 percent by weight of $CaCl_2$, 0.3 percent by weight of $Ca(OCl)_2$, 1 percent by weight of $Ca(ClO_3)_2$ and no lime. The acidified filtrate was fed to a distilling unit operated at a temperature of 60° C. and a vacuum of 50 mm of Hg. Water was evaporated until the filtrate had a $CaCl_2$ concentration of about 45 percent by weight. The filtrate was transferred to a crystallizer and cooled while stirring to a temperature of 27° C. Needles of crystalline calcium chloride hexahydrate were formed and recovered from a waste liquor. The crystals were washed with a saturated $CaCl_2$ solution and air dried. The crystals assayed at 49.5 percent by weight of $CaCl_2$.

EXAMPLE 2

The filtrate of EXAMPLE 1, 100 parts, was acidified by the procedure of EXAMPLE 1. The acidified filtrate was distilled at 70° C. under a vacuum of 20 to 30 mm Hg to produce a slurry containing 60 percent by weight of $CaCl_2$. The slurry was filtered through a warm glass frit to produce a filter cake of calcium chloride dihydrate having an assay of 70 percent by weight of $CaCl_2$.

What is claimed is:

1. A process for the recovery of calcium chloride hydrates from calcium hypochlorite process effluents which comprises:
    (a) acidifying an effluent comprised of an aqueous solution of calcium chloride, calcium hypochlorite, and calcium chlorate with a chlorine-containing compound selected from the group consisting of chlorine, hydrochloric acid, and hydrogen chloride to form an acidic aqueous solution of calcium chloride having reduced concentrations of calcium hypochlorite;
    (b) evaporating water from said acidic aqueous solution to produce a concentrated acidic aqueous solution containing at least 45 percent by weight of calcium chloride;
    (c) feeding said concentrated acidic aqueous solution of calcium chloride to a crystallizer to form crystals of a calcium chloride hydrate selected from the group consisting of calcium chloride dihydrate, calcium chloride tetrahydrate, calcium chloride hexahydrate and mixtures thereof;
    (d) separating said crystals of said calcium chloride hydrate from a waste liquor; and
    (e) recovering said crystals of said calcium chloride hydrate.

2. The process of claim 1 in which said crystallizer is a cooling crystallizer and said calcium chloride hydrate is calcium chloride hexahydrate.

3. The process of claim 2 in which said cooling crystallizer is maintained at a temperature in the range of from about 0° to about 30° C.

4. The process of claim 3 in which said crystals of calcium chloride hexahydrate are fed to a dryer to produce crystals of calcium chloride dihydrate or anhydrous calcium chloride.

5. The process of claim 1 in which said crystallizer is an evaporative crystallizer and said calcium chloride hydrate is selected from the group consisting of calcium chloride dihydrate, calcium chloride tetrahydrate, or mixtures thereof.

6. The process of claim 5 in which said evaporative crystallizer is maintained at a temperature of from about 60 to about 80° C. and a vacuum of from about 20 to about 30 millimeters of Hg and said calcium chloride hydrate is calcium chloride dihydrate.

7. The process of claim 1 in which chlorine gas is formed and released during acidification of said effluent, said chlorine gas being recovered and recycled to step (a) as a portion of said chlorine-containing compound.

8. The process of claim 2 in which said evaporation is carried out at temperatures in the range of from about 40° to about 60° C. under a vacuum maintained at from about 25 to to about 60 millimeters of Hg.

* * * * *